(12) United States Patent
Dairymple et al.

(10) Patent No.: US 9,169,430 B2
(45) Date of Patent: Oct. 27, 2015

(54) CHEMICAL TREATMENT METHOD AND ADDITIVE USED TO TREAT FINES MIGRATION AND FLOW THROUGH POROUS MEDIA

(71) Applicant: ECOLAB USA INC., Naperville, IL (US)

(72) Inventors: Eldon Dwyann Dairymple, Pearland, TX (US); Kin-Tai Chang, Sugar Land, TX (US)

(73) Assignee: Ecolab USA Inc., St. Paul, MN (US)

( * ) Notice: Subject to any disclaimer, the term of this patent is extended or adjusted under 35 U.S.C. 154(b) by 350 days.

(21) Appl. No.: 13/663,604

(22) Filed: Oct. 30, 2012

(65) Prior Publication Data

US 2014/0116691 A1    May 1, 2014

(51) Int. Cl.
*E21B 43/16* (2006.01)
*E21B 33/13* (2006.01)
*C09K 8/575* (2006.01)
*E21B 21/00* (2006.01)

(52) U.S. Cl.
CPC ............. C09K 8/5751 (2013.01); *E21B 21/003* (2013.01); *E21B 33/13* (2013.01); *E21B 43/16* (2013.01)

(58) Field of Classification Search
CPC .... C09K 8/5086; C09K 8/885; C08G 59/184; C08G 59/50; E21B 21/003
See application file for complete search history.

(56) References Cited

U.S. PATENT DOCUMENTS

| | | | |
|---|---|---|---|
| 4,497,596 A | 2/1985 | Borchardt et al. | |
| 4,563,292 A | 1/1986 | Borchardt | |
| 4,693,639 A | 9/1987 | Hollenbeak et al. | |
| 5,464,924 A | 11/1995 | Silvis et al. | |
| 6,569,983 B1 | 5/2003 | Treybig et al. | |
| 7,417,011 B2 | 8/2008 | Treybig et al. | |
| 7,504,438 B1 | 3/2009 | Treybig et al. | |
| 7,678,872 B2 | 3/2010 | Glass et al. | |
| 7,721,803 B2 | 5/2010 | Huang et al. | |
| 7,893,136 B2 | 2/2011 | Glass et al. | |
| 8,008,235 B2 * | 8/2011 | Eoff et al. | 507/214 |
| 8,020,617 B2 | 9/2011 | Shenoy et al. | |
| 2010/0163233 A1 | 7/2010 | Abad | |
| 2011/0030950 A1 | 2/2011 | Weaver | |
| 2012/0264885 A1 | 10/2012 | Eoff | |

\* cited by examiner

*Primary Examiner* — Zakiya W Bates
(74) *Attorney, Agent, or Firm* — Brinks Gilson & Lione; Eric D. Babych

(57) ABSTRACT

Methods for reducing fines migration in a porous subterranean reservoir. In certain aspects, the methods include introducing a composition including a water-soluble or dispersible branched polyhydroxyetheramine into the porous subterranean reservoir, maintaining a sufficient temperature in the porous subterranean reservoir for a period of time, adsorbing the composition onto a surface of the porous subterranean reservoir, and stabilizing at least a portion of the fines present in the porous subterranean reservoir. A treatment composition can be used and in certain aspects, the treatment composition can be a reaction product of bisphenol A, an ethanol amine, diethanol amine, and a monofunctionalized polyoxyalkyleneamine.

19 Claims, 13 Drawing Sheets

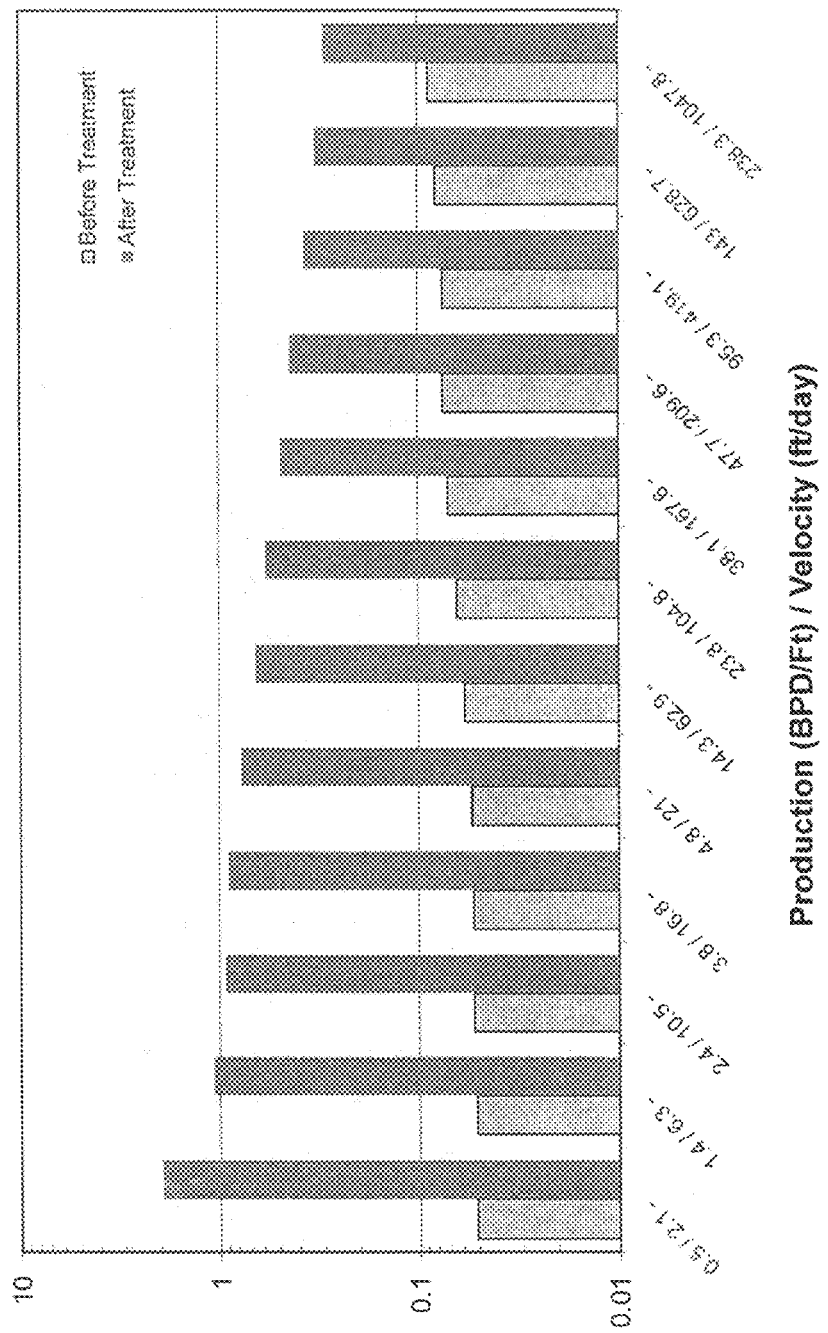

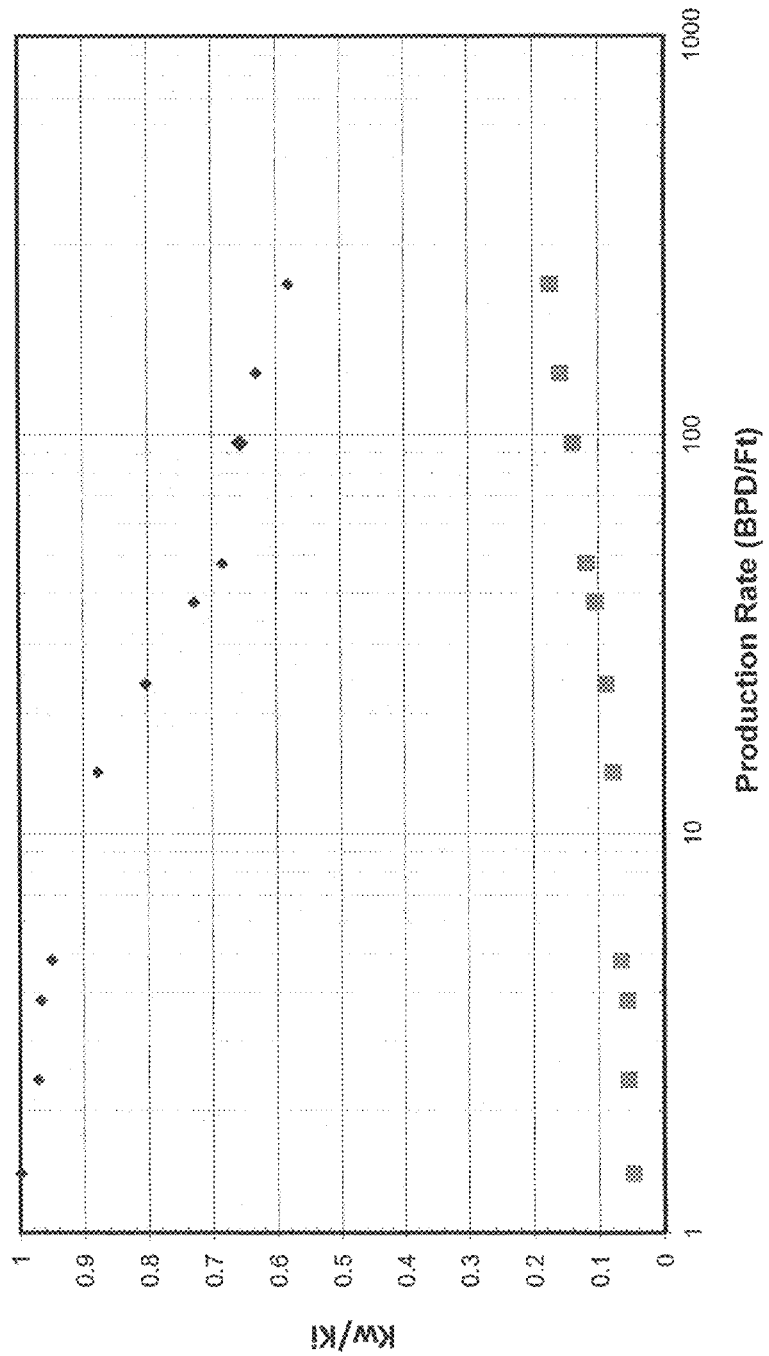

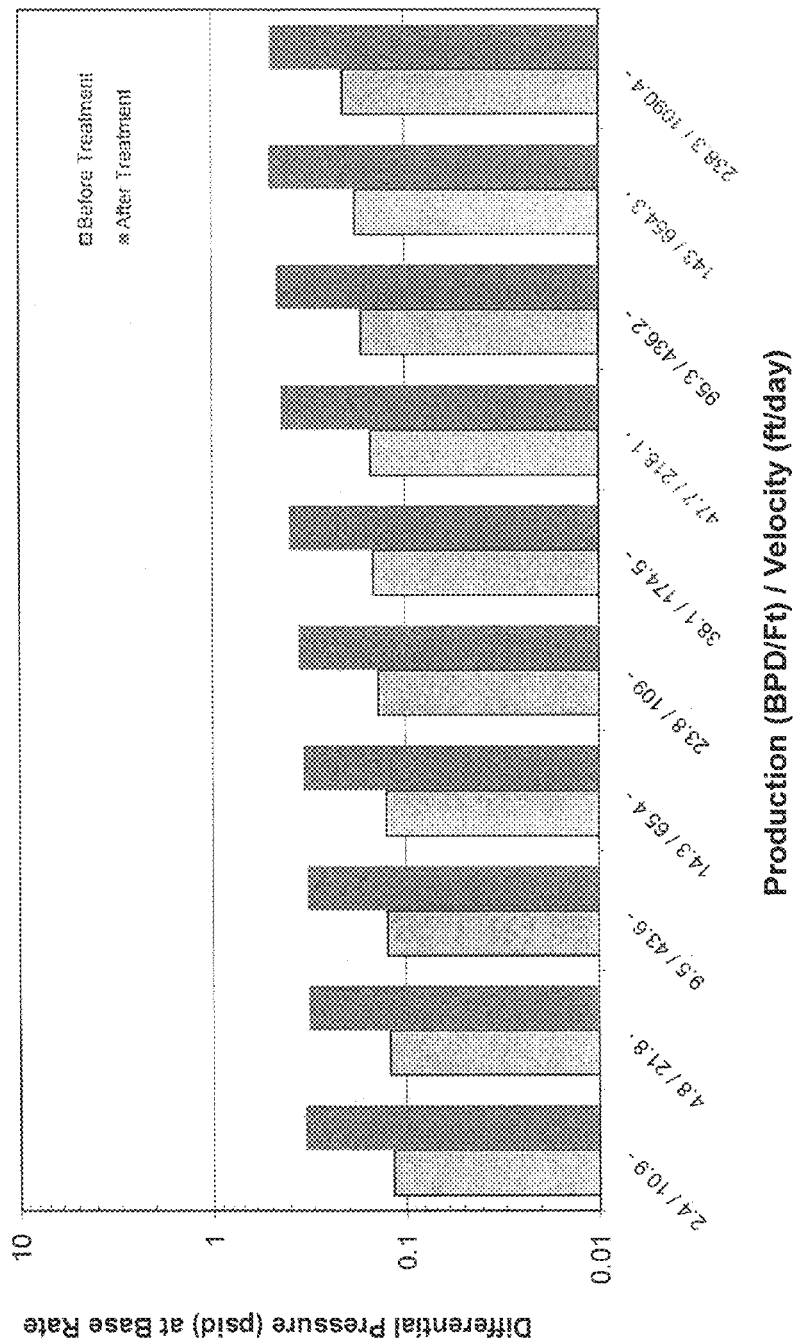

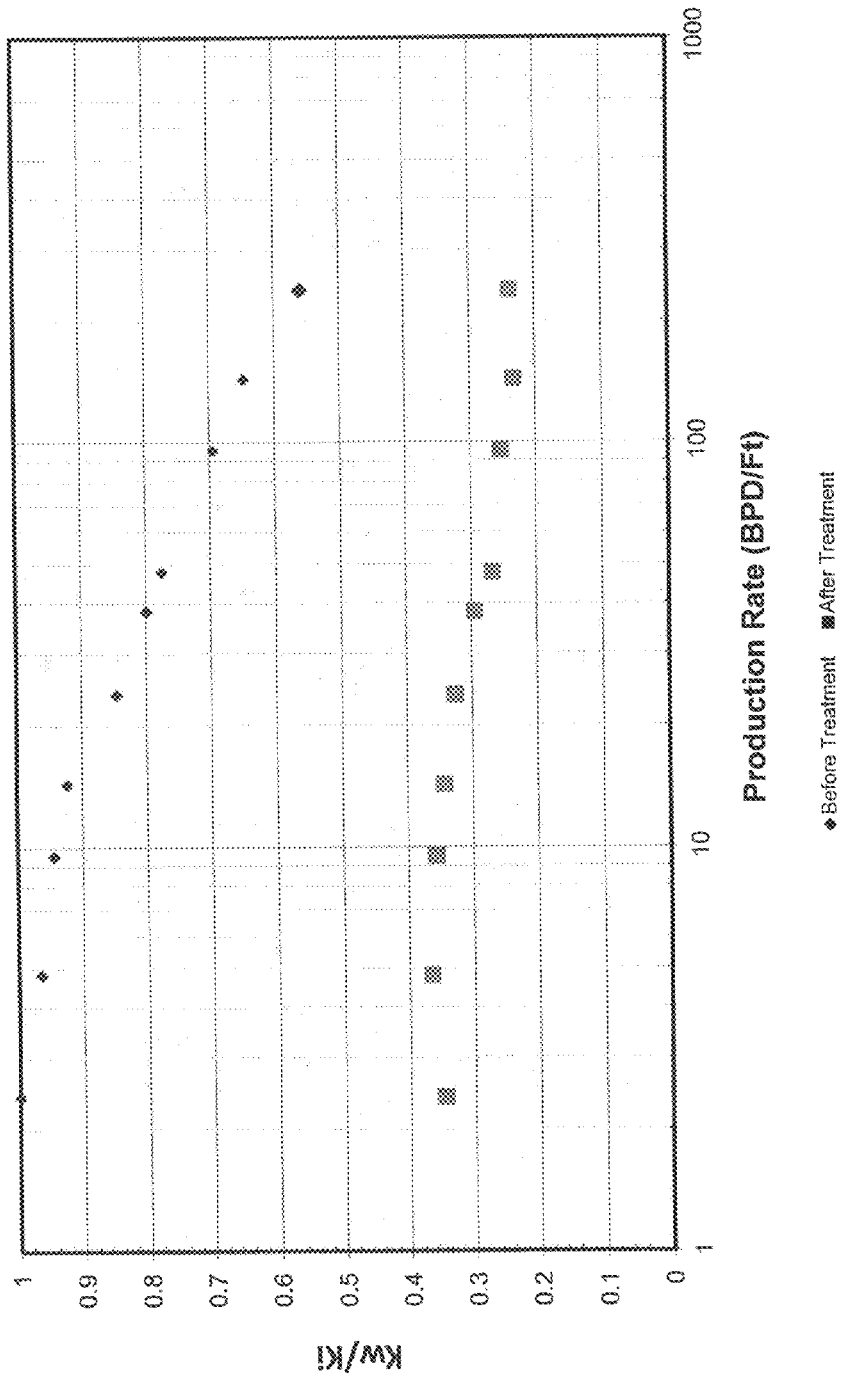

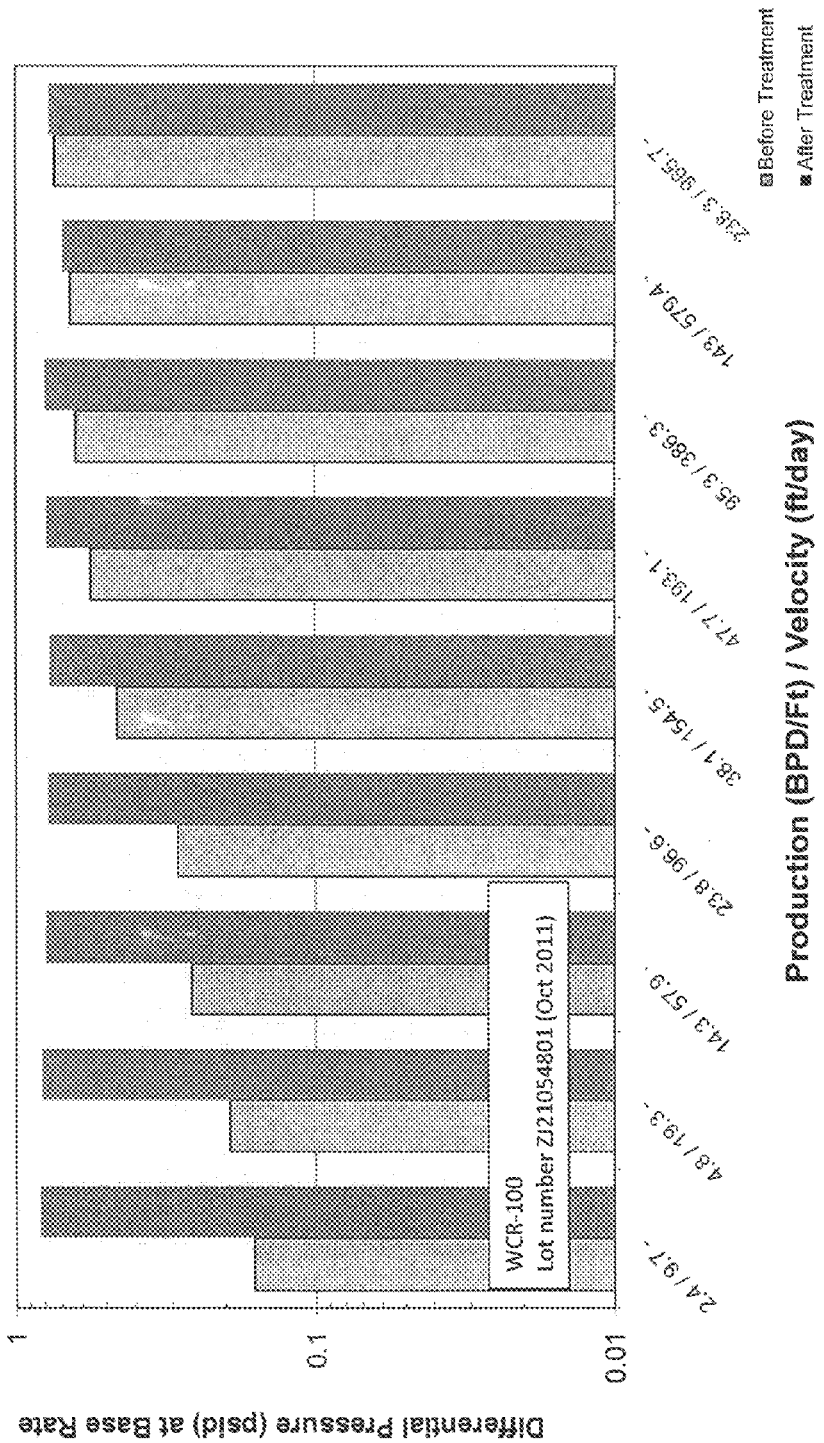

Normalized API Brine Permeability After Velocity Increase
Berea Treated with 10 pvs 4 gpt 0.4% WCR-100 in 2% KCl, Ki=230.62 md

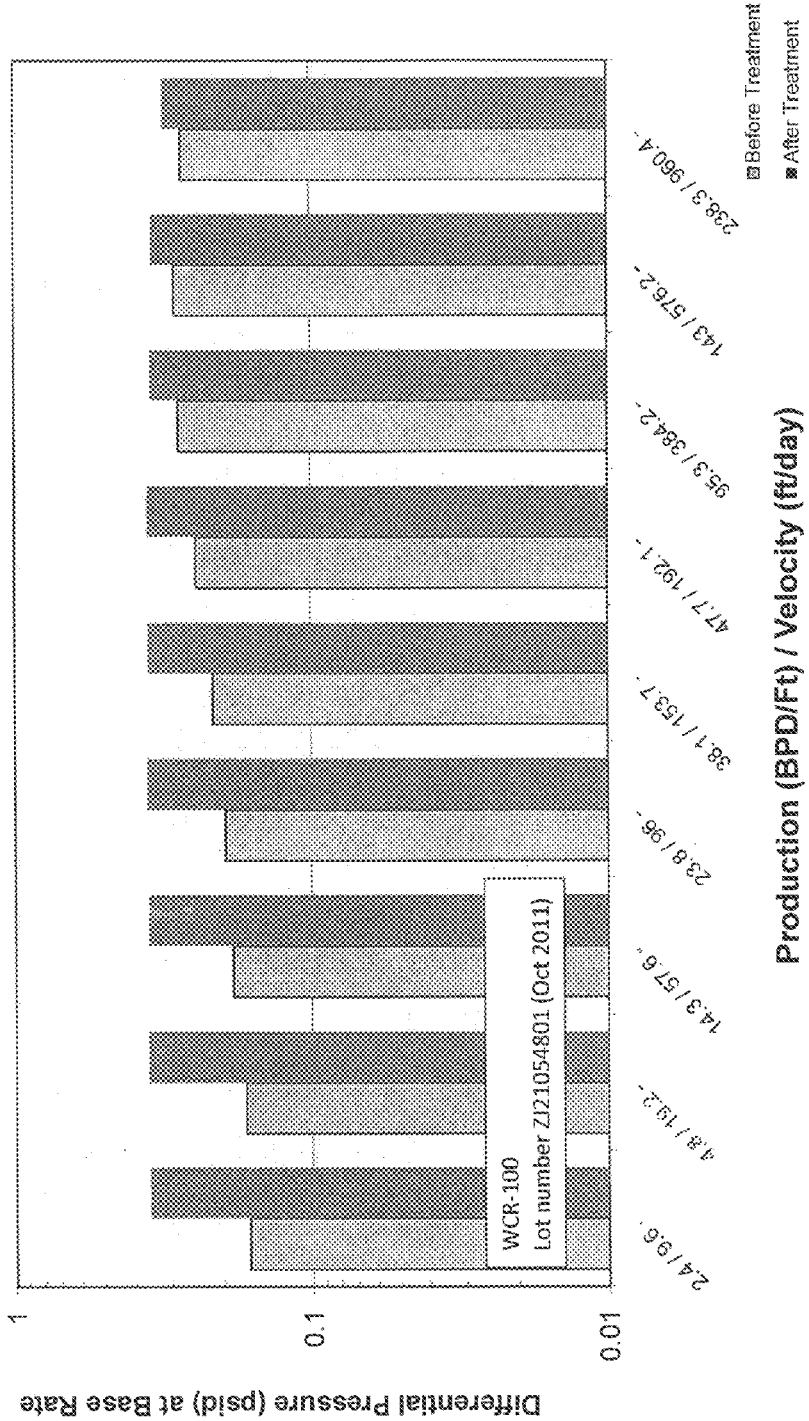

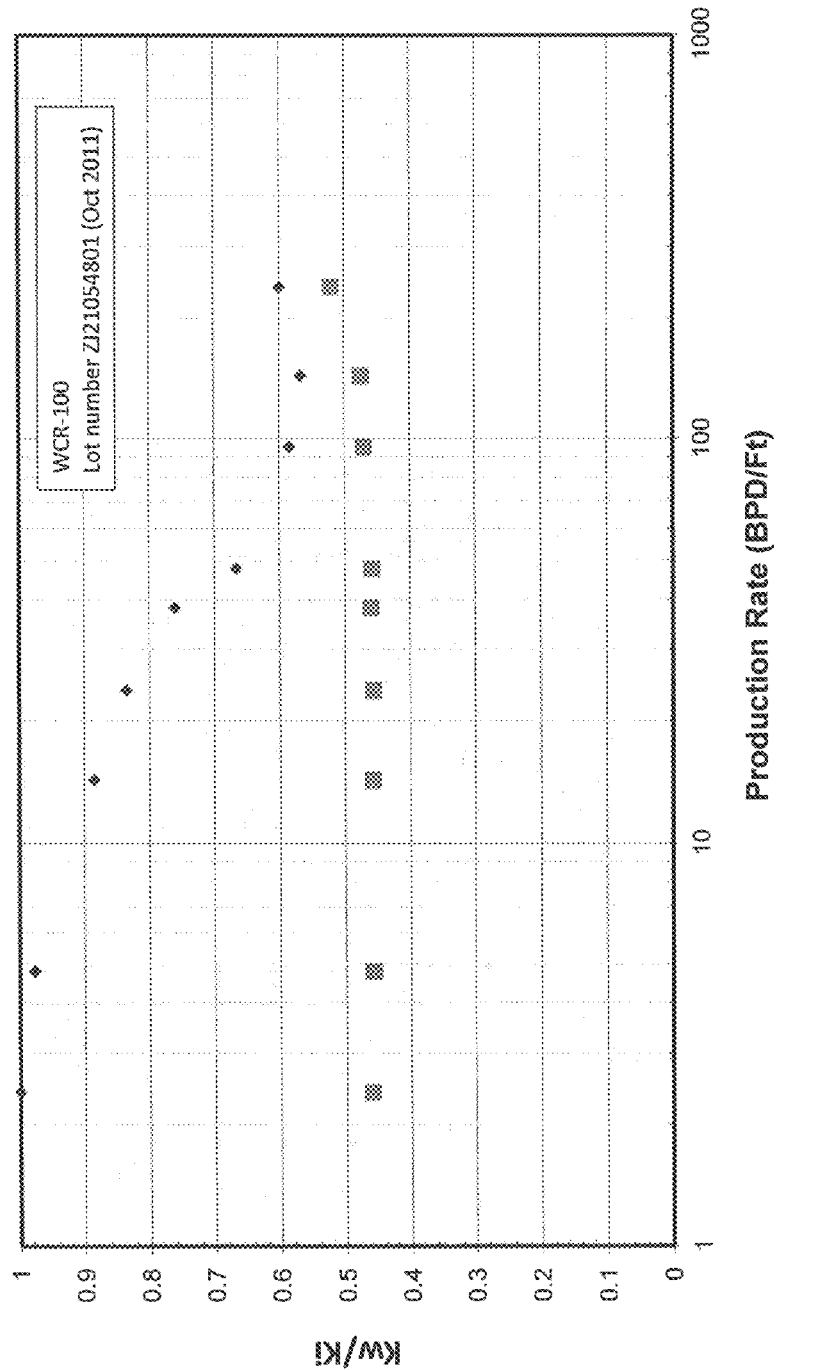

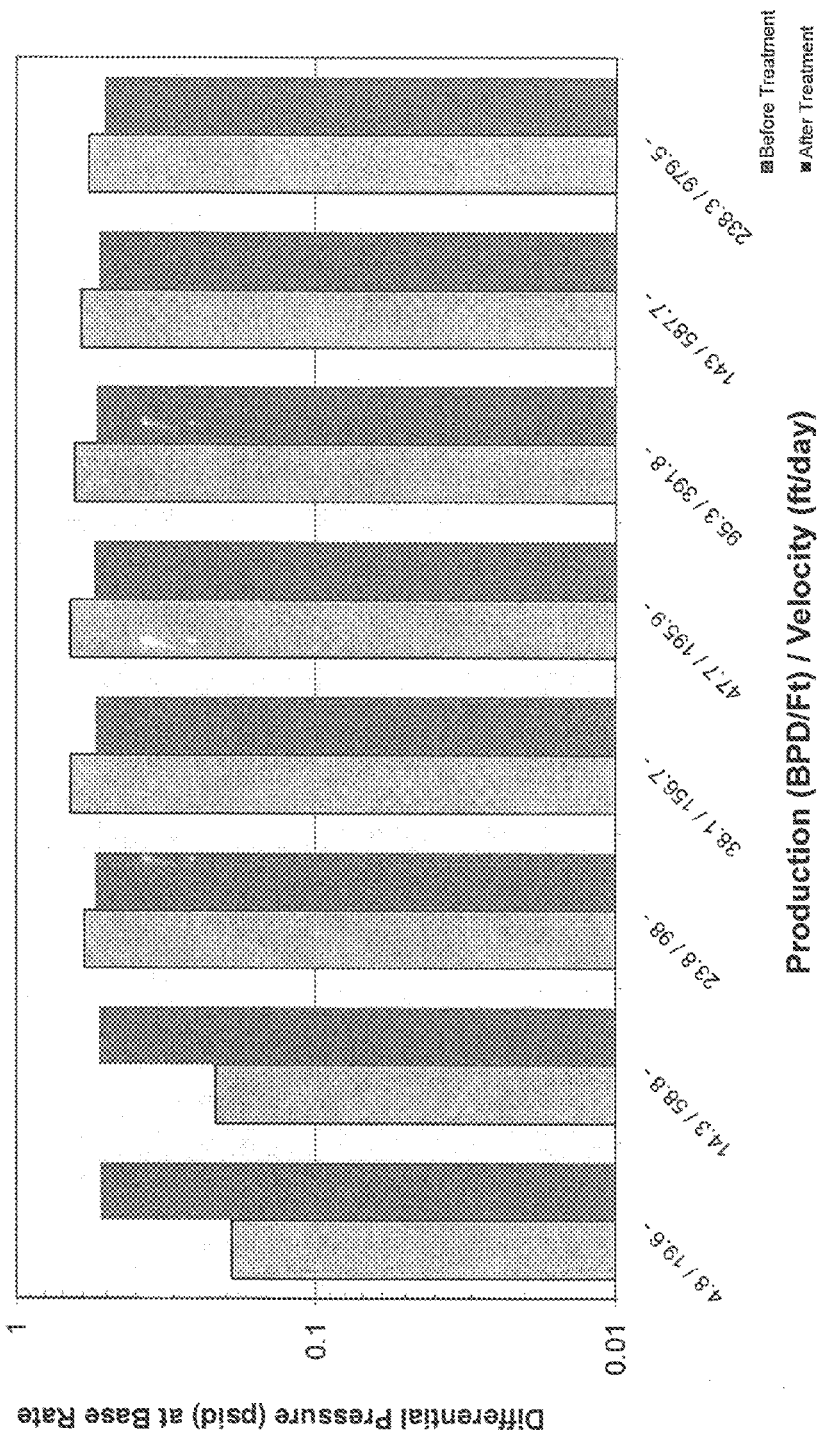

Normalized API Brine Permeability After Velocity Increase
Berea Treated in Reverse Direction with 2% KCl, Ki=385 md

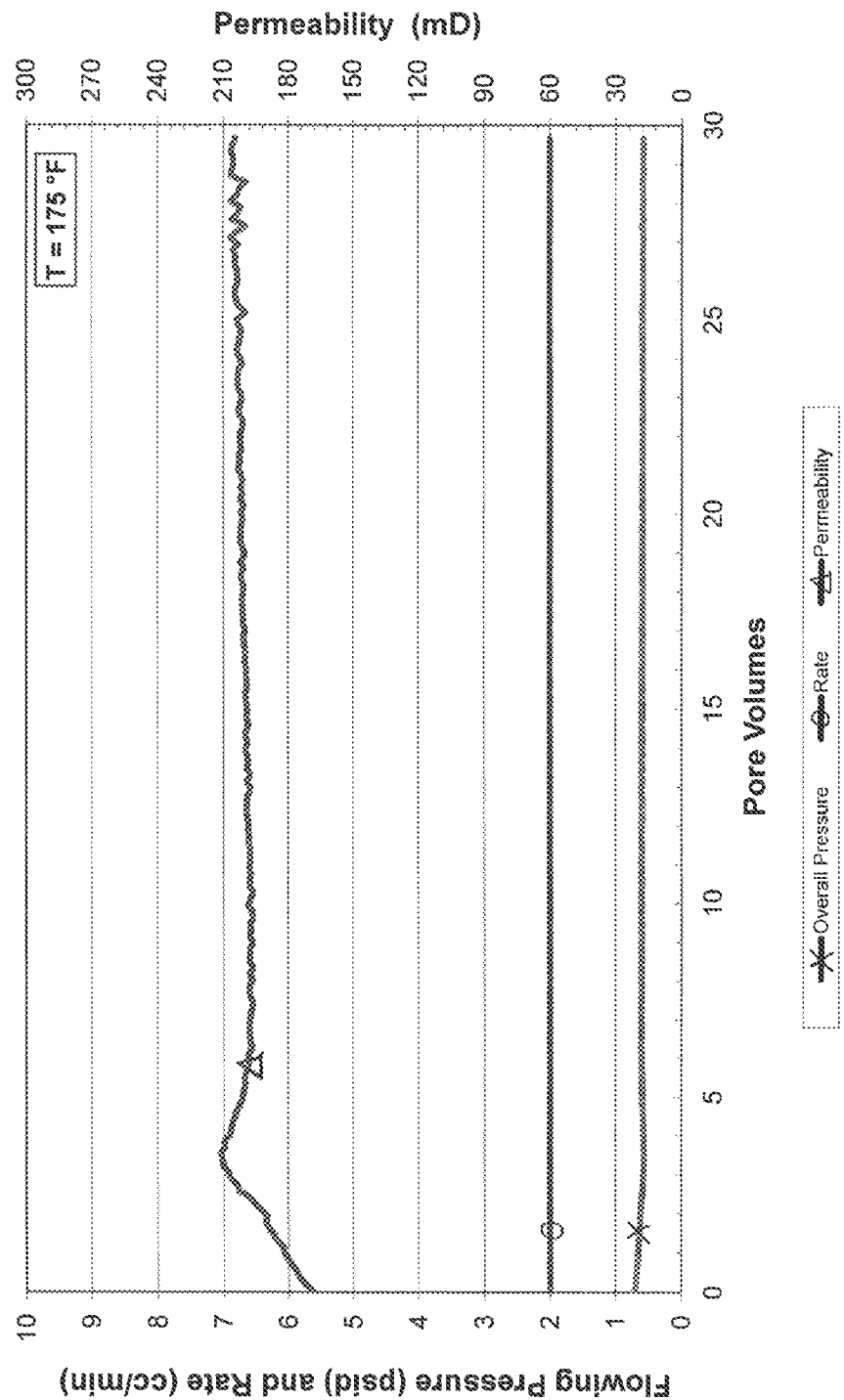

| Kw Before WCR-100 | | |
|---|---|---|
| Q (cc/min) | ΔP (psi) | Kw (mD) |
| 0.1 | 1.3 | 5.8 |
| 0.2 | 1.4 | 10.77 |
| 0.3 | 1.5 | 15.07 |
| 0.4 | 1.5 | 20.1 |
| 0.5 | 1.6 | 23.55 |
| 0.6 | 1.8 | 25.12 |
| 0.7 | 2 | 26.37 |
| 0.8 | 2.3 | 26.21 |
| 0.9 | 3.3 | 20.55 |
| 1 | 2.6 | 20.93 |
| 1.5 | 4.4 | 25.69 |
| 2 | 4.6 | 32.76 |

| Plugs | | |
|---|---|---|
| Berea | | |
| | Area (cm2) | 11.210211 |
| | Long (cm) | 4.31 |
| Fluido | | |
| Visc (cP) @65°C | | 0.8 |

| Kw After WCR-100 | | |
|---|---|---|
| Q (cc/min) | ΔP (psi) | Kw (mD) |
| 0.1 | 0.3 | 25.12 |
| 0.2 | 0.6 | 25.12 |
| 0.3 | 1.2 | 18.84 |
| 0.4 | 1.6 | 18.84 |
| 0.5 | 2.1 | 17.94 |
| 0.6 | 2.3 | 19.66 |
| 0.7 | 2.6 | 20.29 |
| 0.8 | 2.9 | 20.79 |
| 0.9 | 2.9 | 23.39 |
| 1 | 3 | 25.12 |
| 1.5 | 3.3 | 34.25 |
| 2 | 4 | 37.68 |
| 2.5 | 4.6 | 40.95 |
| 3 | 5.5 | 41.1 |
| 4 | 7 | 43.06 |
| 4.5 | 7.7 | 44.04 |

| Plugs | | |
|---|---|---|
| Berea | | |
| | Area (cm2) | 11.21021 |
| | Long (cm) | 4.31 |
| Fluido | | |
| Visc (cP) @65°C | | 0.8 |

CHEMICAL TREATMENT METHOD AND ADDITIVE USED TO TREAT FINES MIGRATION AND FLOW THROUGH POROUS MEDIA

CROSS-REFERENCE TO RELATED APPLICATIONS

Not applicable

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A SEQUENCE LISTING, A TABLE, OR A COMPUTER PROGRAM

Not applicable.

BACKGROUND OF THE INVENTION

1. Field of the Invention

The disclosure pertains to the treatment of fines migration. In particular, the disclosure pertains to treating a subterranean reservoir with a water-soluble alkylene oxide branched polyhydroxyetheramine additive to stabilize or immobilize fines and thereby prohibit their migration.

2. Description of the Related Art

Fine particles of clays and other minerals (hereinafter "fines") are often found contained in within the pore throats of reservoir rocks. These fines can become dislodged by the flow of fluids, such as water (fresh or saline) and cause movement within the pore throat area. Fines can also be generated from abrasion of proppant grains against one another during hydraulic fracture stimulation and/or gravel packing operations. For example, when gas shale is hydraulically fracture stimulated, it can sometimes literally shatter into very small fragments, which would also result in problems associated with fines migration, such as reducing not only the effective permeability of the created fracture, but also reducing the fracture flow capacity of the propped fracture.

Production of oil and/or gas can often be hampered by damage to the permeability caused by fines migration within the reservoir and/or the propped fracture(s). The interaction between injected fluids and the fines is exasperated as a result of a combination of mechanical shear forces, colloid-chemical reactions and geochemical transformations. This interaction, along with the temperature and pressure changes in the reservoir, may lead to the blocking or plugging of pores in the reservoir, thereby reducing flow capabilities.

Existing fines control treatments include commercially available cationic organic polymers (COP's), such as CLA-Sta FS, CLA-Sta XP, etc., silanes, and nanoparticles. However, COP's and silanes are only effective in sandstone formations and clays which have anionic sites on which the materials can attach via electrostatic attractions. Due to these limitations, it would be desirable to produce a treatment that would form a protective film over any surface (e.g. sandstone, clay, carbonate, shale, etc.) and also stabilize the fines to prohibit their migration.

BRIEF SUMMARY OF THE INVENTION

In an aspect, the present disclosure provides for a method for reducing fines migration in a porous subterranean reservoir. The method can comprise (i) introducing a composition comprising a water-soluble or dispersible branched polyhydroxyetheramine into the porous subterranean reservoir; (ii) maintaining a sufficient temperature in the porous subterranean reservoir for a period of time (iii) optionally adsorbing the composition onto a surface of the porous subterranean reservoir; and (iv) stabilizing at least a portion of the fines present in the porous subterranean reservoir thereby reducing fines migration.

In another aspect, the present disclosure provides for a method for enhancing an effective permeability of a porous subterranean reservoir. The method can comprise i) introducing a composition comprising a water-soluble or dispersible branched polyhydroxyetheramine into the porous subterranean reservoir; and ii) enhancing the effective permeability of the reservoir to a flow of aqueous fluids, as well as hydrocarbons.

In certain aspects, the water soluble or dispersible polyhydroxyetheramine is a reaction product of bisphenol A (a diepoxy compound), an ethanol amine, diethanol amine, and a monofunctionalized polyoxyalkyleneamine (an example of which is Jeffamine™).

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE SEVERAL VIEWS OF THE DRAWINGS

A detailed description of the invention is hereafter described with specific reference being made to the drawings in which:

FIG. 1 shows differential pressures vs. production/velocity before and after treatment with the disclosed polyhydroxyetheramines.

FIG. 1A shows normalized API brine permeability after velocity increase both before and after treatment with the disclosed polyhydroxyetheramines.

FIG. 2 shows differential pressures vs. production/velocity before and after treatment with the disclosed polyhydroxyetheramines.

FIG. 2A shows normalized API brine permeability after velocity increase both before and after treatment with the disclosed polyhydroxyetheramines.

FIG. 3 shows differential pressures vs. production/velocity before and after treatment with the disclosed polyhydroxyetheramines.

FIG. 4 shows differential pressures vs. production/velocity before and after treatment with the disclosed polyhydroxyetheramines.

FIG. 4A shows normalized API brine permeability after velocity increase both before and after treatment with the disclosed polyhydroxyetheramines.

FIG. 5 shows differential pressures vs. production/velocity before and after treatment with the disclosed polyhydroxyetheramines.

FIG. 5B shows flowing pressures and rates vs. pore volumes.

DETAILED DESCRIPTION OF THE INVENTION

Figure 3A:
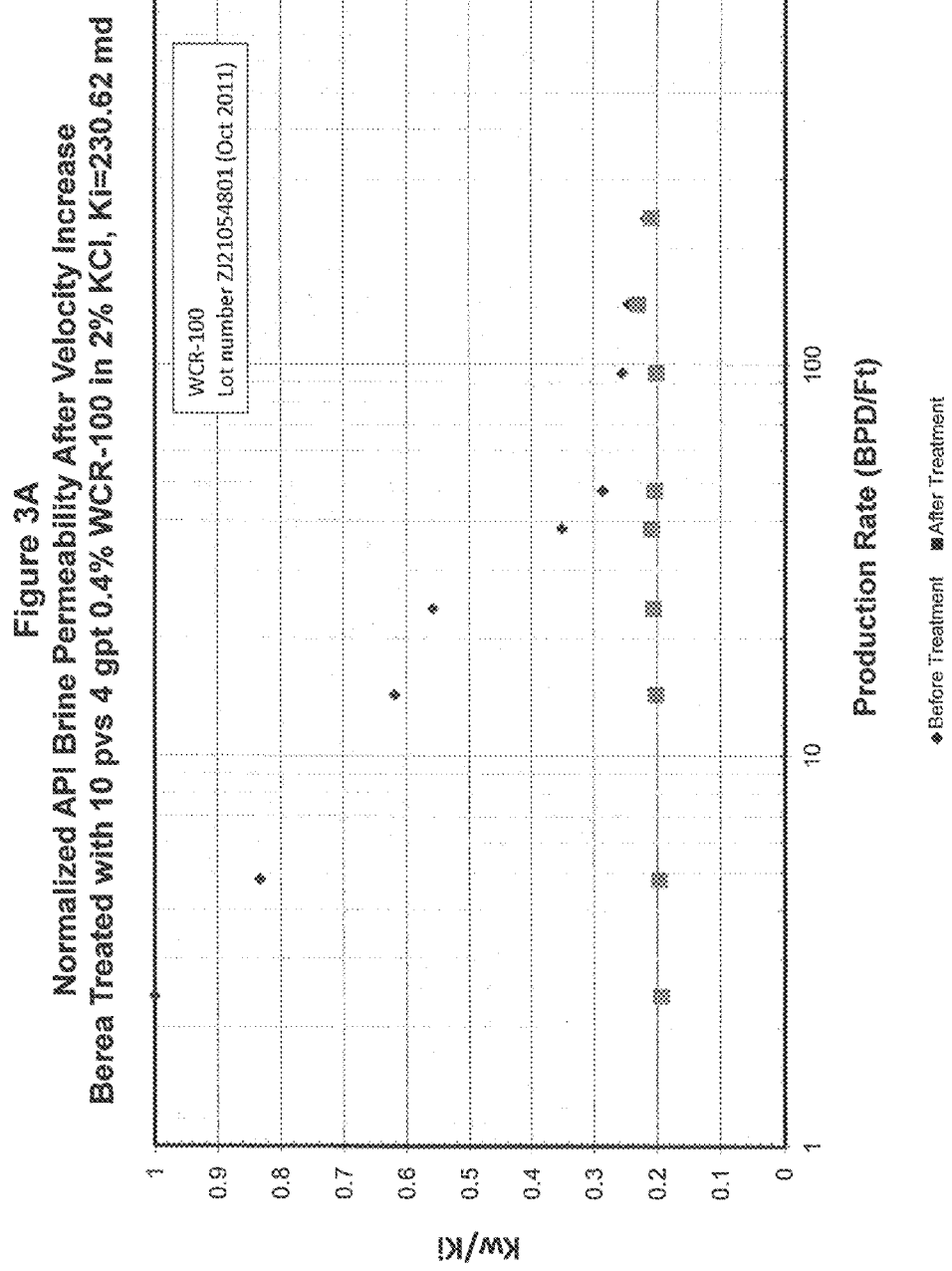
FIG. 3A shows normalized API brine permeability after velocity increase both before and after treatment with the disclosed polyhydroxyetheramines.
Figure 5A:
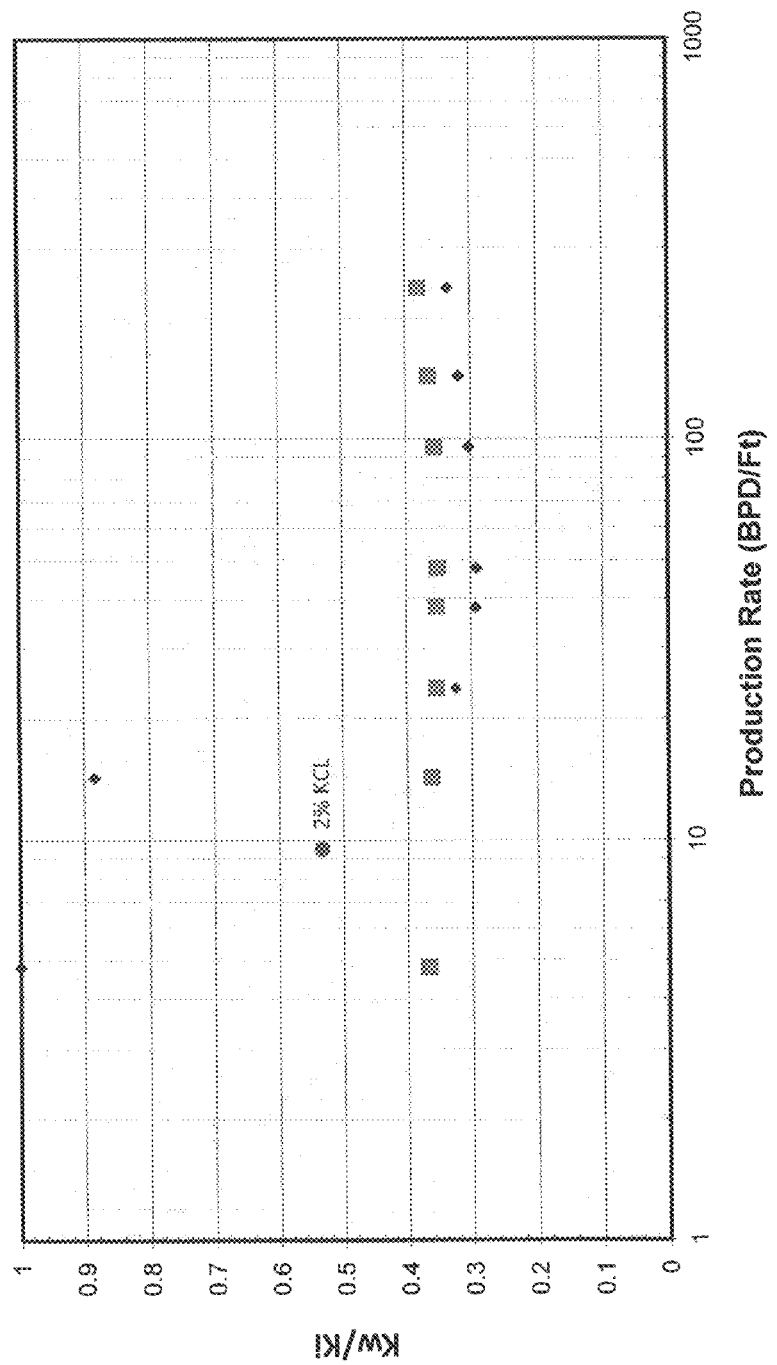
FIG. 5A shows normalized API brine permeability after velocity increase both before and after treatment with the disclosed polyhydroxyetheramines.

Certain studies have been performed where polyhydroxyetheramines have been added to subterranean reservoirs to reduce the effective permeability to the flow of aqueous brine or water with little to no damage (reduction) to the effective permeability to the flow of hydrocarbon. The theory was that the chemical, which would be on the surface of the rock and between the rock and the water, would impede (decrease) water flow through the pore throat. If fines had been present during these studies and responsible for the reduction to the effective permeability to water, they would have likewise reduced the effective permeability to the oil.

Typically, when the potential for fines migration exists, the flow of fluid through the porous media must be maintained below what is termed the "critical rate." The critical rate is defined as that flow rate above which the fines begin to move or migrate within the pore throats.

During production, fines can become lodged in the pore throats and thereby block or restrict the flow of fluids. Various treatments have been used to dislodge the fines, such as placing various chemicals in the reverse flow direction in the reservoir at a relatively high flow rate. This procedure clears the blockage of the particles or fines from the plugged pore throats. However, when flow is resumed in the normal flow direction, if migrating fines are present in the reservoir, it would be expected that they would move through the pore throats and again form blocking/restrictions over time.

It has now been unexpectedly discovered that water soluble or dispersible polyhydroxyetheramines can actually enhance the effective permeability to the flow of aqueous brine or water and also enhance the effective permeability to the flow of hydrocarbon in a subterranean reservoir. That is, it has been unexpectedly discovered that the effective permeability to fluids (both water/brine and hydrocarbons) after polyhydroxyetheramine treatment can be significantly increased (enhanced) over that measured prior to treatment (see Drawing Figures).

While not wishing to be bound by any theory, it is hypothesized that if the fines are becoming stabilized or "locked" in place, the pore throats could remain unblocked and higher base line permeability could be achieved. Thus, it is theorized that the water soluble or dispersible polyhydroxyetheramines can form a "film" coating over the surface area of porous media. It is also theorized that the water soluble or dispersible polyhydroxyetheramines can form a coating over any fines which may be present within the porous media. The porous media may include sandstone, limestone, dolomite, etc. The fines can be comprised of materials such as sandstone, carbonate, shale, clay, and the like. By forming the coating over the various surfaces of the fines, the coating can stabilize the fines or attach them in place to a wall within the reservoir, thereby preventing their migration and significantly increasing the critical flow rate required to resume movement or migration of the fines.

Thus, it can be seen that the present disclosure advantageously provides a treatment that can improve productivity of oil and gas wells by prevention/limiting fines migration problems. As an example, the present disclosure could be used to provide a treatment that increases flow conductivity of sand beds by decreasing the impact of fines generated during hydraulic fracturing stimulation. Aspects of the present disclosure could also be incorporated into hydraulic fracture stimulation and acid stimulation treatments to help control/prevent fines migration problems. As an additional example, the present treatment could be used as a remedial treatment for fines migration issues.

In an aspect, the method for reducing fines migration in a porous subterranean reservoir includes the steps of (i) introducing a composition comprising a water-soluble or dispersible branched polyhydroxyetheramine into the porous subterranean reservoir; (ii) maintaining a sufficient temperature in the porous subterranean reservoir for a period of time; (iii) adsorbing the composition onto a surface of the porous subterranean reservoir; and (iv) stabilizing at least a portion of the fines present in the porous subterranean reservoir. In certain aspects, the composition is introduced in a reverse or opposite flow direction compared to a normal flow production direction. In all aspects disclosed herein, the composition can be introduced into the subterranean reservoir according to a variety of procedures, all of which are well known in the art.

In an aspect, the water-soluble or dispersible branched polyhydroxyetheramine composition is an alkylene oxide branched polyhydroxyetheramine or a salt thereof.

In certain aspects, the alkylene oxide branched polyhydroxyetheramine can be synthesized by reacting a diepoxide or a mixture of diepoxides and multi-epoxide compounds with a) one or more alkylene oxide functionalized amines or a mixture of one or more alkylene oxide functionalized amines and one or more amines; b) one or more amines having two reactive hydrogen atoms; and c) optionally reacting the resulting polyhydroxyetheramine with an acid or alkylating agent to form the salt.

The diepoxide can be any one of the following diepoxides: diglycidyl esters of diacids, diglycidyl ethers of diols, diglycidyl ethers of polyols, diglycidyl ethers of polyhydric phenols and epoxidized olefins.

The alkylene oxide functionalized amine can be any one of the following amines of formula (a)-(d):

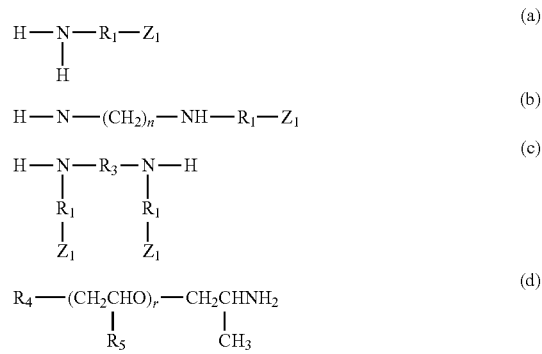

$R_1$ can be independently selected at each occurrence from formula $(-CH_2-CH_2-O-)_p$, or formula $(-CH_2-CH$ $(CH_3)$—O—$)_q$, or a mixture thereof. $R_3$ can be $C_2$-$C_{20}$ alkylene, optionally substituted with alkylamido, hydroxy, alkoxy, halo, cyano, aryloxy, alkylcarbonyl or arylcarbonyl. $R_4$ can be alkoxy and $R_5$ can be H or —$CH_3$. $Z_1$ can be independently selected at each occurrence from hydrogen, $C_1$-$C_7$ alkyl and acyl, and n, p, q and r can be independently selected from integers of 1 to about 45.

The amines can be any one of the following amines: hexylamine, heptylamine, octylamine, nonylamine, decylamine, undecylamine, dodecylamine, tridecylamine, tetradecylamine, hexadecylamine, octadecylamine, and 13-docosen-1-amine (erucylamine) or any aryl amines.

The amine having two reactive hydrogen atoms can be any one of the following amines of formula (e)-(g):

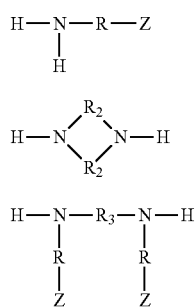

R can be $C_2$-$C_{30}$ alkylene or aryl, optionally substituted with one or more hydroxy or hydroxyalkyl groups. $R_2$ can be $C_2$-$C_{10}$ alkylene, optionally substituted with alkylamido, hydroxy, alkoxy, cyano, dialkylamine, aryloxy, alkylcarbonyl or arylcarbonyl. $R_3$ can be $C_2$-$C_{20}$ alkylene optionally substituted with alkylamido, hydroxy, alkoxy, halo, cyano, aryloxy, alkylcarbonyl or arylcarbonyl, and Z can be hydrogen, alkylamido, hydroxy, dialkylamine, alkoxy, aryoxy, cyano, alkylcarbonyl, or arylcarbonyl.

For example, R can be methylene or ethylene, $R_2$ can be ethylene, $R_3$ can be $C_2$-$C_{20}$ alkylene optionally substituted with alkylamido, dialkylamino, hydroxy or alkoxy, and Z can be alkylamido, dialkylamino, hydroxy or alkoxy. Also, in certain aspects, the amine having two reactive hydrogen atoms can be any one of the following: methylamine, ethylamine, propylamine, butylamine, sec-butylamine, isobutylamine, 3,3-dimethylbutylamine, hexylamine, benzylamine, 2-amino-1-butanol, 4-amino-1-butanol, 2-amino-2-methyl-1-propanol, 6-amino-1-hexanol, ethanolamine, propanolamine, tris(hydroxymethyl)aminomethane, 1-amino-1-deoxy-D-sorbitol, 3-amino-1,2-propanediol, 2-amino-2-methyl-1,3-propanediol, 2-amino-2-ethyl-1,3-propanediol, 3-(dimethylamino)propylamine, N,N-dimethylethylenediamine, N,N-diethylethylenediamine, 1-(2-aminoethyl)piperidine, 4-(2-aminoethyl)morpholine, 2-(2-aminoethyl)-1-methylpyrrolidine, 1-(2-aminoethyl)pyrrolidine, 2-(2-aminoethyl)pyridine, 2-(2-aminoethoxy)ethanol, 2-(2-aminoethylamino)ethanol, piperazine, 2-methylpiperazine, 2,6-dimethylpiperazine, 2-(methylamido)piperazine, N,N'-bis(2-hydroxyethyl)ethylenediamine, N,N'-dimethylethylenediamine, N,N'-dimethyl-1,4-phenylenediamine, and N,N'-dimethyl-1,6-hexanediamine.

In certain aspects, the diglycidyl esters of diacids, diglycidyl ethers of diols, diglycidyl ethers of polyols, and epoxidized olefins can be any one of the following: diglycidyl ether of dimer acid, bis(2,3-epoxypropyl)ether, diglycidyl ether of 1,4-butanediol, diglycidyl ether of neopentyl glycol, diglycidyl ether of ethylene glycol, glycerol diglycidyl ether, diglycidyl ether of sorbitol, diglycidyl ether of trimethylol propane, diglycidyl ether of polyethyleneglycols, diglycidyl ether of polypropylene glycols, diglycidyl ether of glycols from the reaction of ethylene oxide with propylene oxide, diglycidyl ether of cyclohexane dimethanol, 1,2,3,4-diepoxybutane, 1,2,7,8-diepoxyoctane, 1,2,9,10-diepoxydecane, 1,2,5,6-diepoxycyclooctane, and diglycidyl ethers of glycerol.

The diglycidyl ether of a polyhydric phenol can be any one of the following: diglycidyl ethers of resorcinol, catechol, hydroquinone, bisphenol A, bisphenol F, bisphenol E, bisphenol K, 4,4'-dihydroxydiphenyl sulfide, bisphenol S, 4,4'-thiodiphenol, 2,6-dihydroxynaphthalene, 1,4'-dihydroxynapthalene, 9,9-bis(4-hydroxyphenyl)fluorine, dihydroxy dinitrofluorenylidene, diphenylene, 2,2-bis(4-hydroxyphenyl)-acetamide, 2,2-bis(4-hydroxyphenyl)ethanol, 2,2-bis(4-hydroxyphenyl)-N-methylacetamide, 2,2-bis(4-hydroxyphenyl)-N,N-dimethylacetamide, 3,5-dihydroxyphenylacetamide, 2,4-dihydroxyphenyl-N-(hydroxyethyl)-acetamide, 2,2-bistris-hydroxyphenyl methane, 2,6,2',6'-tetrabromo-p,p'-bisphenol A, 2,6,2',6'-tetramethyl-3,5,3'-tribromo-p,p'-biphenol, 2,6,2',6'-tetramethyl-3,5,3'5'-tetrabromo-p,p'-biphenol, tetramethylbiphenol, 4,4'-dihydroxydiphenylethylmethane, 3,3'-dihydroxydiphenyldiethylmethane, 3,4'-dihydroxydiphenylmethylpropylmethane, 4,4'-dihydroxydiphenyloxide, 4,4'-dihydroxydiphenylcyanomethane, 4,4'-sulfonyldiphenol, 4,4'-oxydiphenol, and 4,4'-dihydroxybenzophenone.

In certain aspects, the water-soluble alkylene oxide branched polyhydroxyetheramine comprises secondary amine, tertiary amine or ditertiary amine end groups.

Also, provided is a method for synthesizing the water-soluble alkylene oxide branched polyhydroxyetheramine comprising secondary amine, tertiary amine or ditertiary amine end groups. The method can include the steps of reacting a diepoxide with a) one or more alkylene oxide functionalized amines or a mixture of one or more alkylene oxide functionalized amines and one or more fatty amines; b) one or more amines having two reactive hydrogen atoms to form the water-soluble alkylene oxide branched polyhydroxyetheramine; and c) reacting the water-soluble alkylene oxide branched polyhydroxyetheramine with one or more amines having one or two reactive hydrogen atoms.

An alternate method for synthesizing the water-soluble alkylene oxide branched polyhydroxyetheramine comprising secondary amine, tertiary amine or ditertiary amine end groups is also disclosed. The method includes the steps of reacting a diepoxide with a) one or more alkylene oxide functionalized amines or a mixture of one or more alkylene oxide functionalized amines and one or more fatty amines; b) one or more amines having two reactive hydrogen atoms; and c) one or more amines having 3 or more reactive hydrogen atoms to form the water-soluble alkylene oxide branched polyhydroxyetheramine; and d) reacting the water-soluble alkylene oxide branched polyhydroxyetheramine with one or more amines having one or two reactive hydrogen atoms.

In certain aspects, the alkylene oxide branched polyhydroxyetheramine is prepared by reacting a mixture of diepoxide and one or more aliphatic or aromatic triepoxides with a) one or more alkylene oxide functionalized amines or a mixture of one or more alkylene oxide functionalized amines and one or more fatty amines; and b) one or more amines having two reactive hydrogen atoms to impart cross linking. In some aspects, the method further includes the step of reacting the alkylene oxide branched polyhydroxyetheramine with an acid or alkylating agent.

In particular aspects of this disclosure, the water-soluble or dispersible branched polyhydroxyetheramine can be prepared by a) reacting an amine having two reactive hydrogen atoms with a diepoxide to form a polyhydroxyetheramine; and then b) reacting the polyhydroxyetheramine with an N-alkylating agent to form the water-soluble branched polyhydroxyetheramine. In some aspects, the method further comprising the step of reacting the polyhydroxyetheramine with an amine having one or two reactive hydrogen atoms. In certain aspects, the method further comprises the step of adding one or more aliphatic triepoxides simultaneously with the diepoxide.

The amine having two reactive hydrogen atoms can be any one of the following amines of formula (a)-(g):

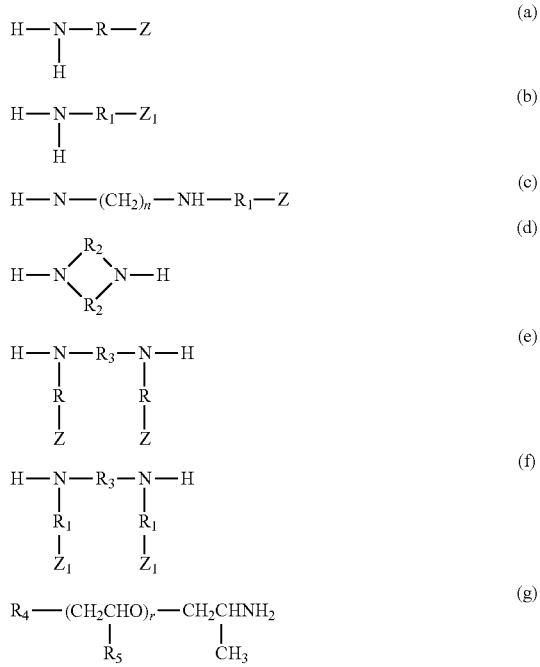

R can be $C_2$-$C_{10}$ alkylene, optionally substituted with one or more hydroxy or hydroxyalkyl groups. $R_1$ can be independently selected at each occurrence from a group of formula $(-CH_2-CH_2-O-)_p$ and a group of formula

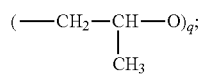

$R_2$ can be $C_2$-$C_{10}$ alkylene, optionally substituted with alkylamido, hydroxy, alkoxy, halo, cyano, dialkylamine, aryloxy, alkylcarbonyl, or arylcarbonyl. $R_3$ can be $C_2$-$C_{20}$ alkylene optionally substituted with alkylamido, hydroxy, alkoxy, halo, cyano, aryloxy, alkylcarbonyl, or arylcarbonyl. $R_4$ can be alkoxy. $R_5$ can be H or $-CH_3$. Z can be hydrogen, alkylamido, hydroxy, dialkylamine, alkoxy, halo, aryoxy, cyano, alkylcarbonyl, or arylcarbonyl. $Z_1$ can be hydrogen, $C_1$-$C_7$ alkyl or acyl, and n, p, q and r can be independently selected from integers of 1 to about 45.

For example, R can be methylene or ethylene. $R_2$ can be ethylene. $R_3$ can be $C_2$-$C_{20}$ alkylene optionally substituted with alkylamido, dialkylamino, hydroxyl, or alkoxy, and Z can be alkylamido, dialkylamino, hydroxy or alkoxy.

In accordance with the present disclosure, the amine can be any one of the following amines: methylamine, ethylamine, propylamine, butylamine, sec-butylamine, isobutylamine, 3,3-dimethylbutylamine, hexylamine, benzylamine, 2-amino-1-butanol, 4-amino-1-butanol, 2-amino-2-methyl-1-propanol, 6-amino-1-hexanol, ethanolamine, propanolamine, tris(hydroxymethyl)aminomethane, 1-amino-1-deoxy-D-sorbitol, 3-amino-1,2-propanediol, 2-amino-2-methyl-1,3-propanediol, 2-amino-2-ethyl-1,3-propanediol, 3-(dimethylamino)propylamine, N,N-dimethylethylenediamine, N,N-diethylethylenediamine, 1-(2-aminoethyl)piperidine, 4-(2-aminoethyl)morpholine, 2-(2-aminoethyl)-1-methylpyrrolidine, 1-(2-aminoethyl)pyrrolidine, 2-(2-aminoethyl)pyridine, 2-(2-aminoethoxy)ethanol, 2-(2-aminoethylamino)ethanol, piperazine, 2-methylpiperazine, 2,6-dimethylpiperazine, 2-(methylamido)piperazine, N,N'-bis(2-hydroxyethyl)ethylenediamine, N,N'-dimethylethylenediamine, N,N'-dimethyl-1,4-phenylenediamine, and N,N'-dimethyl-1,6-hexanediamine.

Also in accordance with the present disclosure, the diepoxide can be any one of the following diepoxides: diglycidyl esters of diacids, diglycidyl ethers of diols, epoxidized olefins, diglycidyl ether of dimer acid, bis(2,3-epoxypropyl) ether, diglycidyl ether of 1,4-butanediol, diglycidyl ether of neopentyl glycol, diglycidyl ether of ethylene glycol, glycerol diglycidyl ether, diglycidyl ether of polyethyleneglycols, diglycidyl ether of polypropylene glycols, diglycidyl ether of glycols from the reaction of ethylene oxide with propylene oxide, diglycidyl ether of cyclohexane dimethanol, 1,2,3,4-diepoxybutane, 1,2,7,8-diepoxyoctane, 1,2,9,10-diepoxydecane, and 1,2,5,6-diepoxycyclooctane.

In certain aspects, the N-alkylating agent can be any one of the following: halogen-containing polyalkoxides, alkyl halides, alcohol sulfonates, and alpha olefin sulfonates.

In accordance with certain aspects of the present disclosure, the water-soluble branched polyhydroxyetheramine can be any one of: 1) a diethanolamine capped ethanolamine/diglycidyl ether of neopentyl glycol copolymer grafted with epichlorohydrin terminated polyethyleneglycol methyl ether; 2) an N,N,N'-trimethyl-1,3-propanediamine capped ethanolamine/3-(dimethylamino)propylamine/diglycidyl ether of neopentyl glycol terpolymer grafted with epichlorohydrin terminated polyethyleneglycol methyl ether polymer; 3) a diethanolamine capped 3-(dimethylamino)propylamine/ethanolamine/poly(ethylene glycol) diglycidyl ether terpolymer grafted with epichlorohydrin terminated polyethyleneglycol methyl ether; or 4) a diethanolamine capped 3-(dimethylamino)propylamine/ethanolamine/ethylene glycol diglycidyl ether terpolymer grafted with epichlorohydrin terminated polyethyleneglycol methyl ether.

In any aspect disclosed herein, the water soluble or dispersible polyhydroxyetheramine composition can be the reaction product of bisphenol A (a diepoxy compound), an ethanol amine, diethanol amine, and Jeffamine™, which is a monofunctionalized polyoxyalkyleneamine. An example of such a product is sold under the name WCR-100. Such water soluble or dispersible polyhydroxyetheramine compositions and processes for preparing such compositions are disclosed in U.S. Pat. Nos. 7,893,136 and 7,678,872, the contents of which are expressly incorporated herein by reference.

A non-limiting illustrative example of a process used to synthesize a representative water soluble or dispersible polyhydroxyetheramine composition according to the present disclosure is as follows. Into a 0.5 L glass resin kettle was added D.E.R. 322 (72.210 g, EEW=172.4), Jeffamine™ M-2070

(65.356 g), ethanolamine (10.884 g), and diethanolamine (1.579 g). The reaction mixture was stirred under nitrogen purge and heated to 50° C., at which point, the reaction began self-heating. Cooling was applied to the resin kettle to maintain the reaction temperature below 80° C. After the exotherm subsided, the reaction mixture was heated at 80° C. for 1 hour to yield a viscous resin that was cloudy due to entrained gas bubbles. D.I. water (25 mL) was added drop wise to the stirred reaction mixture at a rate 10 mL/min. to reduce viscosity. The reaction was allowed to continue at 80° C. for 1.5 hours, and then an additional 25 mL of D.I. water was added at a rate of 10 mL/min. After stirring an additional 10 minutes, the temperature was reduced to 50° C., and the reaction was diluted with 550 mL of D.I. water. The resulting mixture was stirred at 50° C. for 2 hours to give a colorless translucent solution comprising 20% solids by weight. A small portion of the aqueous resin solution was heated in an oven for 2 hours at 120° C. to yield a dried product with an inherent viscosity of 0.21 dL/g (N,N-dimethylformamide, 30.0° C., 0.5 g/dL).

As previously discussed, in any aspect disclosed herein, the composition can be synthesized using Jeffamine™, which is a monofunctionalized polyoxyalkyleneamine. Representative examples of Jeffamine™ that can be used to synthesize the water soluble or dispersible polyhydroxyetheramine composition are M-1000 and M-2070. Other suitable Jeffamine™ analogues that can be used can be found in the publication "The JEFFAMINE® Polyetheramines," by Huntsman, which can be found at http://www.huntsman.com/portal/page/portal/performance_products/Media %20Library/global/files/jeffamine_polyetheramines.pdf, the contents of which are expressly incorporated herein by reference.

In certain aspects, the composition can be diluted in a brine solution to form a brine mixture and the brine mixture can then be pumped into the porous subterranean reservoir at a matrix rate. The term matrix rate refers to a process of injecting a fluid into a subterranean reservoir at pressures below the fracturing (parting) pressure of the reservoir rock. In some aspects, the brine comprises from about 2 wt % to about 7 wt % KCl. In other aspects, the brine comprises about 6 wt % NaCl.

In other aspects, the disclosed method can also include the steps of (i) mixing the composition with a hydraulic fracturing fluid to form a fracturing mixture and (ii) introducing the mixture into the porous subterranean reservoir during fracture stimulation, thereby stabilizing fines generated from the fracture stimulation and fines inherently present in the porous subterranean reservoir.

In further aspects, the disclosed method can also include the steps of (i) mixing the composition with an acidizing additive to form a acidizing mixture and (ii) introducing the acidizing mixture into the porous subterranean reservoir during an acid stimulation treatment, thereby stabilizing fines generated by acid dissolution of rock within the porous subterranean reservoir and fines inherently present in the porous subterranean reservoir.

As noted, the composition disclosed in the present application can be introduced into the subterranean reservoir as a mixture with an additional introduced fluid. In certain aspects, the composition is introduced into the reservoir in an amount from about 0.001% to about 2% by weight of the composition, based on a total volume of the introduced fluid. The introduced fluid can be, for example, water, brine (salt water), hydraulic fracture stimulation fluid (i.e. fracking fluid or fracing fluid), acidizing additives, or any other type of aqueous fluid. In other aspects, the composition is introduced into the subterranean reservoir in an amount from about 0.02% to about 0.16% by weight of the composition, based on a total volume of the aforementioned introduced fluid.

In accordance with the present disclosure, the composition can be introduced into the subterranean reservoir in a reverse or opposite flow direction compared to a normal flow production direction.

The sufficient temperature to cause the composition to adsorb onto the surface of the porous subterranean reservoir while stabilizing at least a portion of the fines present in the subterranean reservoir can be at least 100° F. The time sufficient to cause the composition to adsorb onto the surface of the porous subterranean reservoir while stabilizing at least a portion of fines present in the subterranean reservoir can be about 8 to 12 hours.

In certain aspects, maintaining the sufficient temperature in the porous subterranean reservoir for the time sufficient to cause the composition to adsorb onto the surface of the porous subterranean reservoir, while stabilizing at least the portion of fines present in the subterranean reservoir, creates stabilization of fines resistant to temperatures down to 100° F. and up to 350° F.

According to certain aspects of the methods disclosed herein, the composition can be introduced into the subterranean reservoir and it can coat or adsorb onto the interior of the reservoir. The composition can also coat or adsorb onto surfaces of the fines. In certain aspects, the fines can be located adjacent to an interior wall of the subterranean reservoir and when the composition adsorbs or coats a surface of the fines, it stabilizes them. In some aspects, stabilization is accomplished by coating a surface of the fines which are located upon the interior wall of the reservoir, whereby the coating holds them in place against the wall of the subterranean reservoir.

For example, the subterranean reservoir formation can maintain a minimum temperature for a time sufficient to allow the composition to adsorb onto the surface of the porous subterranean reservoir and any fines present in the rock. However, once adsorption occurs, it makes no difference if the rock temperature drops below that minimum temperature. In certain aspects, a cooling aqueous preflush could be pumped into the formation to cool it down below the targeted minimum temperature, allowing a deeper penetration into the formation. Then, once the well is shut-in, the formation can heat back up to its normal gradient temperature. Once it reached that minimum temperature, the composition would react and adsorb permanently to the rock and fines surfaces.

In accordance with the present disclosure, the treatment methods and compositions can be incorporated during almost any stage in the life of the well, such as during drilling, completion, or stimulation. When the presently disclosed compositions are used as a treatment to help reduce the problem caused by fines migration, they could be incorporated into treatments which historically resulted in the release of fines, such as acidizing, hydraulic fracture stimulation, sand control operations, etc. In those cases, it would be used during the completion phase of the well, or during a stimulation work-over procedure. In another aspect, it could be used to help mitigate fines migration problems already being experienced.

As previously noted, movement of fines through a porous matrix causes reduced permeability. Critical flow velocity (CFV) can be defined as the maximum rate at which a fluid may flow through a porous matrix without causing the fines within the rock matrix to begin to move and block the connecting pore throats. Once the CFV is exceeded and fines migration begins, the differential pressure and the flow rate are no longer directly proportional. Increases in flow rate result in further reduction in permeability. In a linear core flow test, permeability is calculated using the following equation:

$$K = QuL/(\text{delta}P \cdot CSA)$$

Where:
K=permeability in darcies
Q=Flow rate in cc/sec
U=viscosity of the moving fluid in centipoise
L=length of core in cm
deltaP=differential pressure across core in atmospheres pressure
CSA=cross sectional area of core in cm$^2$ The foregoing may be better understood by reference to the following examples, which are intended only for illustrative purposes and are not intended to limit the scope of the invention.

Example 1

To obtain the data shown in the drawing figures, the following experimental procedures were carried out.

Core plugs were cleaned, dried, and their weights were recorded. Plugs were then vacuum saturated with a first brine fluid to be flooded and then the saturated weights were measured. Both the dried and the saturated weights were used to calculate the accessible pore volume. The procedures were carried out using berea sandstone that had migrating fines present.

The core was mounted in a standard Hassler style core holder under the conditions of 1000 psi net confining stress, 500 psi pore pressure, and a temperature of about 150 T. The core was flooded with brine solution at a minimal rate/velocity typically equivalent to 0.01 ml/min. This was the base flow velocity. If necessary, the base flow rate could be higher in order to attain a reliable differential pressure measurement. The flood is conducted to a stable differential pressure (permeability) and a minimum of one pore volume. The flow velocity was then increased in a series of increments returning to the base velocity between each incremental increase. This was continued until the base flow velocity changes by more than 20%, or to a maximum anticipated production (injection) velocity near the wellbore was attained. By comparing permeability at the lower base flow rate, the effect of non-Darcy flow at higher rates was not a factor.

Permeability at the base rate is plotted in certain drawing figures versus the previous flow rate/velocity and converted to wellbore injection rate if parameters to scale the experiment were available.

The critical flow velocity is bracketed between the lowest value that did not result in a change in the permeability at the base rate and higher value that did result in a significant change in the base rate permeability. This change may be either an increase or decrease in permeability. An increase in permeability may be observed in short cores and/or cores with large pore throats. These types of core plug do not offer significant restriction to provide bridging points for mobilized fines. Therefore, the fines are produced from the core resulting in permeability enhancement. If the core plug was sufficiently long and/or had a smaller pore size distribution, bridging of mobilized fines may occur within the core resulting in a permeability decline.

The "before treatment" points in the drawing figures indicate the impact on effective permeability by increased fluid flow through the cores. In each of these drawing figures, one can see that the permeability is reduced with each step in flow rate. The CFV in all of the drawing figures was at an equivalent rate in a wellbore of 10 barrels water per day per foot of internal.

The "after treatment" points in the drawing figures indicate that rate no longer has an effect on the permeability. These data points were obtained by combining an aspect of the presently disclosed treatment composition with the water/brine solution.

To obtain the data in the figures, the treatment composition used was a water soluble or dispersible polyhydroxyetheramine composition that was a reaction product of bisphenol A (a diepoxy compound), an ethanol amine, diethanol amine, and Jeffamine™, which is a monofunctionalized polyoxyalkyleneamine. The specific aspect of this composition that was used was a product that is sold under the name WCR-100. Water/brine was pumped at increasing flow rates (W1). The ramp up started at 0.1 ml/min, until steady state pressure, and was increased by 0.5 ml/min steps (e.g. 0.1, 0.5, 1.0, etc.). The ΔP vs Q trend was analyzed in order to determine the maximum flow rate (Qmax) to avoid fines migration. The treatment volume was 10 PV at 10 ml/min in the reverse flow direction (or the rate determined in step 2, whichever was less). If a ΔP=500 psi was reached before the 10 VP are pumped, the treatment stage was stopped. The system was shut in at temperature and pressure for 24 hours. The after treatment water/brine injection (W2) started at 0.1 ml/min and the flow rate was increased as described above, after steady state pressure conditions were achieved, until the maximum flow rate (Qmax) was reached. The test conditions were as follows: Temperature=150° F., Confining pressure=1500 psi, Treatment concentration=0.4% v/v.

There was no CFV observed in the tests following treatment. The reduction in permeability observed compared to before treatment permeability values can be attributed to the relative permeability modifier effect of the presently disclosed treatment to water.

Proof of a successful fines migration chemical treatment is observed when the CFV can be increased.

In the drawing figures, the following units are defined as:
pvs="pore volumes" (quantity of fluid to fill the porosity of the core being evaluated)
gpt=gallons per 1000 gallons
BPD=barrels per day (42 gallons/barrel)
Ki=Initial permeability of core before any fines movement or treatment
md=millidarcy=K/1000
Q=rate
RRF=residual resistance factor.

Figure 6:
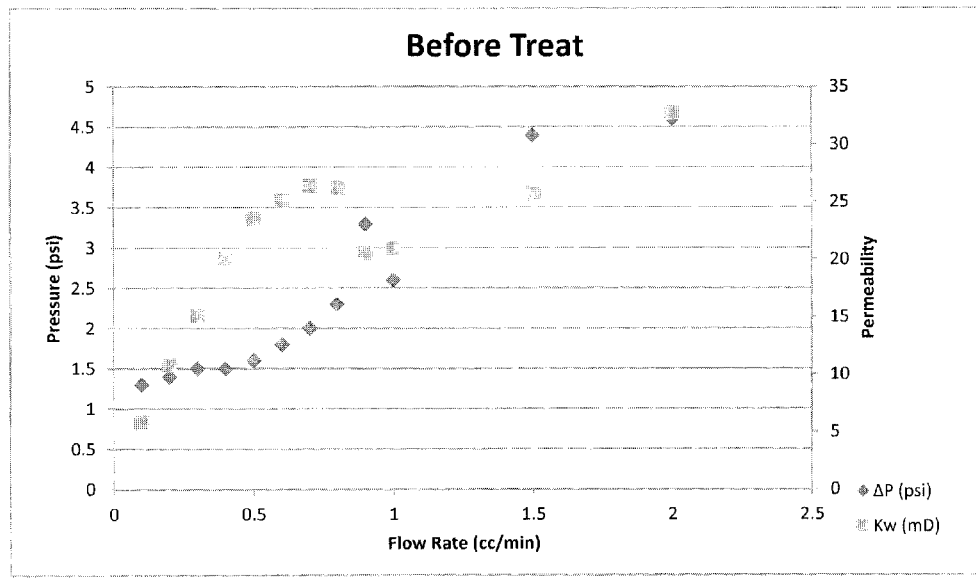
FIG. 6 depicts pressure vs. flow rate vs. permeability before treatment with the disclosed polyhydroxyetheramines.
Figure 7:
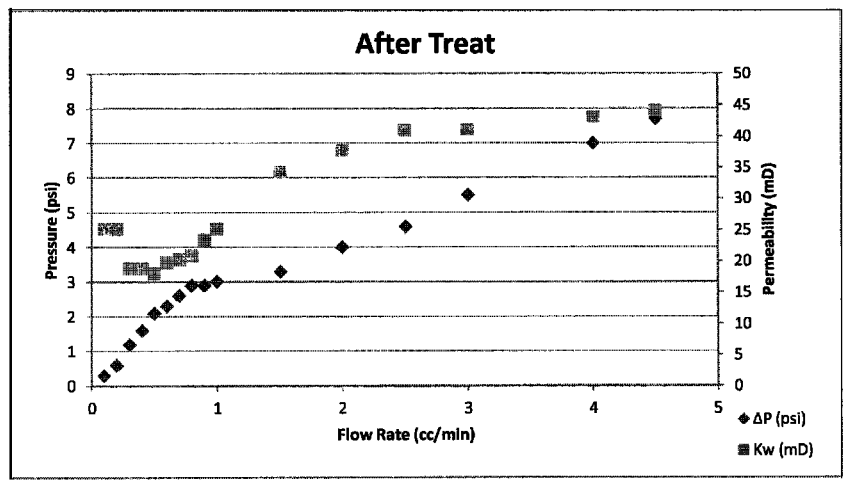
FIG. 7 depicts pressure vs. flow rate vs. permeability after treatment with the disclosed polyhydroxyetheramines.

FIGS. 6 and 7 depict pressure vs. flow rate vs. permeability. As long as one is not operating under turbulent flow, the pressure and the flow rate should be linear, e.g. as the pressure rises across the core the flow rate should rise proportionally and the permeability should not change. Before treatment, it is shown that there is no stability in that even at the lower flow rates, the pressure and flow rates were not proportional with each other and the permeability varied greatly. After the flow rate rose to about 0.75 cc/min, the pressure rose significantly. However, after treatment with aspects of the presently disclosed treatment compositions, it is shown that permeability leveled off after about 1.5 cc/min flow rate and the pressure and flow rates were directly proportional to each other (see FIG. 7). This implies that the fines migration that was causing all of the disproportionality and the disruption in the flow in the before treatment chart (FIG. 6) is no longer an issue and has been taken out of the equation due to the beneficial effects of the presently disclosed treatment compositions.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method for reducing fines migration in a porous subterranean reservoir, the method comprising:
    (i) introducing a composition consisting of a water-soluble or dispersible branched polyhydroxyetheramine into the porous subterranean reservoir;
    (ii) maintaining a sufficient temperature in the porous subterranean reservoir for a period of time;
    (iii) optionally adsorbing the composition onto a surface of the porous subterranean reservoir; and
    (iv) stabilizing at least a portion of the fines present in the porous subterranean reservoir thereby reducing fines migration, wherein the sufficient temperature is at least 100° F.

2. The method of claim 1, wherein the water-soluble or dispersible branched polyhydroxyetheramine is an alkylene oxide branched polyhydroxyetheramine or a salt thereof.

3. The method of claim 2, wherein the alkylene oxide branched polyhydroxyetheramine is prepared by reacting a mixture of diepoxide and one or more aliphatic or aromatic triepoxides with
    a) one or more alkylene oxide functionalized amines or a mixture of one or more alkylene oxide functionalized amines and one or more fatty amines; and
    b) one or more amines having two reactive hydrogen atoms to impart cross linking,
    c) optionally further comprising reacting the alkylene oxide branched polyhydroxyetheramine with an acid or alkylating agent.

4. The method of claim 1, wherein the water-soluble or dispersible branched polyhydroxyetheramine is a product of a reaction comprising:
    reacting a diepoxide or a mixture of diepoxides and multi-epoxide compounds with
    a) one or more alkylene oxide functionalized amines or a mixture of one or more alkylene oxide functionalized amines and one or more amines;
    b) one or more amines having two reactive hydrogen atoms; and
    c) optionally reacting the resulting polyhydroxyetheramine with an acid or alkylating agent to form the salt.

5. The method of claim 1, wherein the water-soluble or dispersible branched polyhydroxyetheramine is prepared by
    a) reacting an amine having two reactive hydrogen atoms with a diepoxide to form a polyhydroxyetheramine; and then reacting the polyhydroxyetheramine with an N-alkylating agent to form the water-soluble branched polyhydroxyetheramine;
    c) optionally further comprising the step of reacting the polyhydroxyetheramine with an amine having one or two reactive hydrogen atoms; and
    d) optionally further comprising the step of adding one or more aliphatic triepoxides simultaneously with the diepoxide.

6. The method of claim 1, wherein the water-soluble or dispersible branched polyhydroxyetheramine is selected from the group consisting of a diethanolamine capped ethanolamine/diglycidyl ether of neopentyl glycol copolymer grafted with epichlorohydrin terminated polyethyleneglycol methyl ether, an N,N,N'-trimethyl-1,3-propanediamine capped ethanolamine/3-(dimethylamino)propylamine/diglycidyl ether of neopentyl glycol terpolymer grafted with epichlorohydrin terminated polyethyleneglycol methyl ether polymer, a diethanolamine capped 3-(dimethylamino)propylamine/ethanolamine/poly(ethylene glycol) diglycidyl ether terpolmer grafted with epichlorohydrin terminated polyethyleneglycol methyl ether, and a diethanolamine capped 3-(dimethylamino)propylamine/ethanolamine/ethylene glycol diglycidyl ether terpolymer grafted with epichlorohydrin terminated polyethyleneglycol methyl ether.

7. The method of claim 1, wherein the composition is introduced into the subterranean reservoir in an amount from about 0.001% to about 2% by weight of the composition, based on a total volume of an introduced fluid.

8. The method of claim 1, wherein the composition is introduced into the subterranean reservoir in an amount from about 0.02% to about 0.16% by weight of the composition, based on a total volume of an introduced fluid.

9. The method of claim 1, wherein the composition is introduced in a reverse or opposite flow direction compared to a normal flow production direction.

10. The method of claim 1, further comprising the steps of (i) diluting the composition in a brine solution to form a brine mixture and (ii) pumping the brine mixture into the porous subterranean reservoir at a matrix rate.

11. The method of claim 10, wherein the brine comprises from about 2 wt % to about 7 wt % KCl.

12. The method of claim 10, wherein the brine comprises about 6 wt % NaCl.

13. The method of claim 1, further comprising the steps of (i) mixing the composition with a hydraulic fracturing fluid to form a fracturing mixture and (ii) introducing the mixture into the porous subterranean reservoir during fracture stimulation, whereby stabilizing fines generated from the fracture stimulation and fines inherently present in the porous subterranean reservoir.

14. The method of claim 1, further comprising the steps of (i) mixing the composition with an acidizing additive to form a acidizing mixture and (ii) introducing the acidizing mixture into the porous subterranean reservoir during an acid stimulation treatment whereby stabilizing fines generated by acid dissolution of rock within the porous subterranean reservoir and fines inherently present in the porous subterranean reservoir.

15. The method of claim 1, wherein the time sufficient to cause the composition to adsorb onto the surface of the porous subterranean reservoir while stabilizing at least a portion of fines present in the subterranean reservoir is about 8 to 12 hours.

16. The method of claim 1, wherein maintaining the sufficient temperature in the porous subterranean reservoir for the time sufficient to cause the composition to adsorb onto the surface of the porous subterranean reservoir while stabilizing at least the portion of fines present in the subterranean reservoir creates stabilization of fines resistant to temperatures down to 100° F. and up to 350° F.

17. A method for reducing fines migration in a porous subterranean reservoir, the method comprising:
(i) introducing a composition comprising a water-soluble or dispersible branched polyhydroxyetheramine into the porous subterranean reservoir;
(ii) maintaining a sufficient temperature in the porous subterranean reservoir for a period of time;
(iii) optionally adsorbing the composition onto a surface of the porous subterranean reservoir; and
(iv) stabilizing at least a portion of the fines present in the porous subterranean reservoir thereby reducing fines migration, wherein the sufficient temperature is at least 100° F., and wherein the water soluble or dispersible polyhydroxyetheramine is a reaction product of bisphenol A (a diepoxy compound), an ethanol amine, diethanol amine, and a monofunctionalized polyoxyalkyleneamine.

18. A method for enhancing an effective permeability of a porous subterranean reservoir, wherein the subterranean reservoir comprises a wall and a plurality of fines, comprising:
i) introducing a composition comprising a water-soluble or dispersible branched polyhydroxyetheramine into the porous subterranean reservoir, wherein the composition forms a coating on the plurality of fines, wherein the coating attaches the plurality of the fines to the wall, thereby preventing migration of the plurality of fines; and
ii) enhancing the effective permeability of the reservoir to a flow of aqueous fluids, as well as hydrocarbons.

19. The method of claim 18, wherein the water soluble or dispersible polyhydroxyetheramine is a reaction product of bisphenol A (a diepoxy compound), an ethanol amine, diethanol amine, and a monofunctionalized polyoxyalkyleneamine.

* * * * *